US012794827B2

(12) United States Patent
K et al.

(10) Patent No.: US 12,794,827 B2
(45) Date of Patent: Nov. 10, 2026

(54) DEVICE, SYSTEM, AND METHOD FOR PREVENTING HIGH PRIORITY PACKET DROPS VIA ADAPTIVE QUEUE LIMITS

(71) Applicant: Juniper Networks, Inc., Sunnyvale, CA (US)

(72) Inventors: Gopi K, Bangalore (IN); Jimmy Jose, Hosur (IN); Amit Arora, Cupertino, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 155 days.

(21) Appl. No.: 18/917,387

(22) Filed: Oct. 16, 2024

(65) Prior Publication Data

US 2026/0106841 A1 Apr. 16, 2026

(51) Int. Cl.

| | |
|---|---|
| ***H04L 47/625*** | (2022.01) |
| ***H04L 43/0882*** | (2022.01) |
| ***H04L 47/11*** | (2022.01) |
| ***H04L 47/2483*** | (2022.01) |
| ***H04L 47/32*** | (2022.01) |

(52) U.S. Cl.

CPC ...... *H04L 47/6255* (2013.01); *H04L 43/0882* (2013.01); *H04L 47/11* (2013.01); *H04L 47/2483* (2013.01); *H04L 47/32* (2013.01)

(58) Field of Classification Search

CPC . H04L 47/6255; H04L 43/0882; H04L 47/11; H04L 47/2483; H04L 47/32

See application file for complete search history.

(56) References Cited

U.S. PATENT DOCUMENTS

2003/0225903 A1* 12/2003 Lodha ................ H04L 41/0896 709/232
2007/0195778 A1* 8/2007 Tatar .................. H04L 49/1546 370/469
2008/0267203 A1* 10/2008 Curcio .................... H04L 49/90 370/412
2012/0039173 A1* 2/2012 Danzig .................. H04L 47/30 370/235
2019/0280991 A1* 9/2019 Singh ...................... H04L 47/24
2025/0192924 A1* 6/2025 Sun ....................... H04L 1/1835

* cited by examiner

*Primary Examiner* — Abdulkader M Alriyashi

(74) *Attorney, Agent, or Firm* — ALG Intellectual Property, LLC

(57) ABSTRACT

A system for preventing high priority packet drops via adaptive queue limits may include a communication interface configured to receive incoming traffic destined for one or more computing devices included in a network. The system may also include circuitry configured to detect a rate of the incoming traffic and to then determine whether a traffic storm has occurred based at least in part on the rate of the incoming traffic. Additionally or alternatively, the circuitry may be configured to modify, based at least in part on whether a traffic storm has occurred, at least one limit of a queue into which the incoming traffic is loaded. Various other systems and methods are also disclosed.

20 Claims, 8 Drawing Sheets

DEVICE, SYSTEM, AND METHOD FOR PREVENTING HIGH PRIORITY PACKET DROPS VIA ADAPTIVE QUEUE LIMITS

BACKGROUND

Certain network infrastructures may necessitate and/or impose stability and/or reliability of interior gateway protocol (IGP) sessions between computing devices. Such IGP sessions may implement and/or rely on high priority packets (e.g., keep-alive packets, etc.) to maintain session integrity. Unfortunately, traffic storms may impair the stability and/or reliability of such IGP sessions by saturating input queues that buffer incoming traffic for processing and/or forwarding purposes. For example, saturated input queues may cause high priority packet drops that lead to instability and/or unreliability in the IGP sessions. The instant disclosure, therefore, identifies and addresses a need for additional and improved devices, systems, and methods for preventing high priority packet drops via adaptive queue limits.

SUMMARY

As will be described in greater detail below, the instant disclosure generally relates to apparatuses, systems, and methods for preventing high priority packet drops via adaptive queue limits. In one example, a system for accomplishing such a task may include a communication interface configured to receive incoming traffic destined for one or more computing devices included in a network. In this example, the system may also include circuitry configured to detect a rate of the incoming traffic and to then determine whether a traffic storm has occurred based at least in part on the rate of the incoming traffic. Additionally or alternatively, the circuitry may be configured to then modify, based at least in part on whether the traffic storm has occurred, at least one limit of a queue into which the incoming traffic is loaded.

Similarly, a corresponding computer-implemented method may involve (1) receiving, by a communication interface, incoming traffic destined for one or more computing devices included in a network, (2) detecting, by circuitry communicatively coupled to the communication interface, a rate of the incoming traffic, (3) determining, by the circuitry, whether a traffic storm has occurred based at least in part on the rate of the incoming traffic, and then (4) modifying, by the circuitry, at least one limit of a queue into which the incoming traffic is loaded based at least in part on whether the traffic storm has occurred.

Additionally or alternatively, a network device that implements the above-identified method may include at least one communication interface configured to receive incoming traffic destined for one or more computing devices included in a network. In one example, the network device may include circuitry configured to detect a rate of the incoming traffic. Additionally or alternatively, the circuitry may be configured to determine whether a traffic storm has occurred based at least in part on the rate of the incoming and to then modify at least one limit of a queue into which the incoming traffic is loaded based at least in part on whether the traffic storm has occurred.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
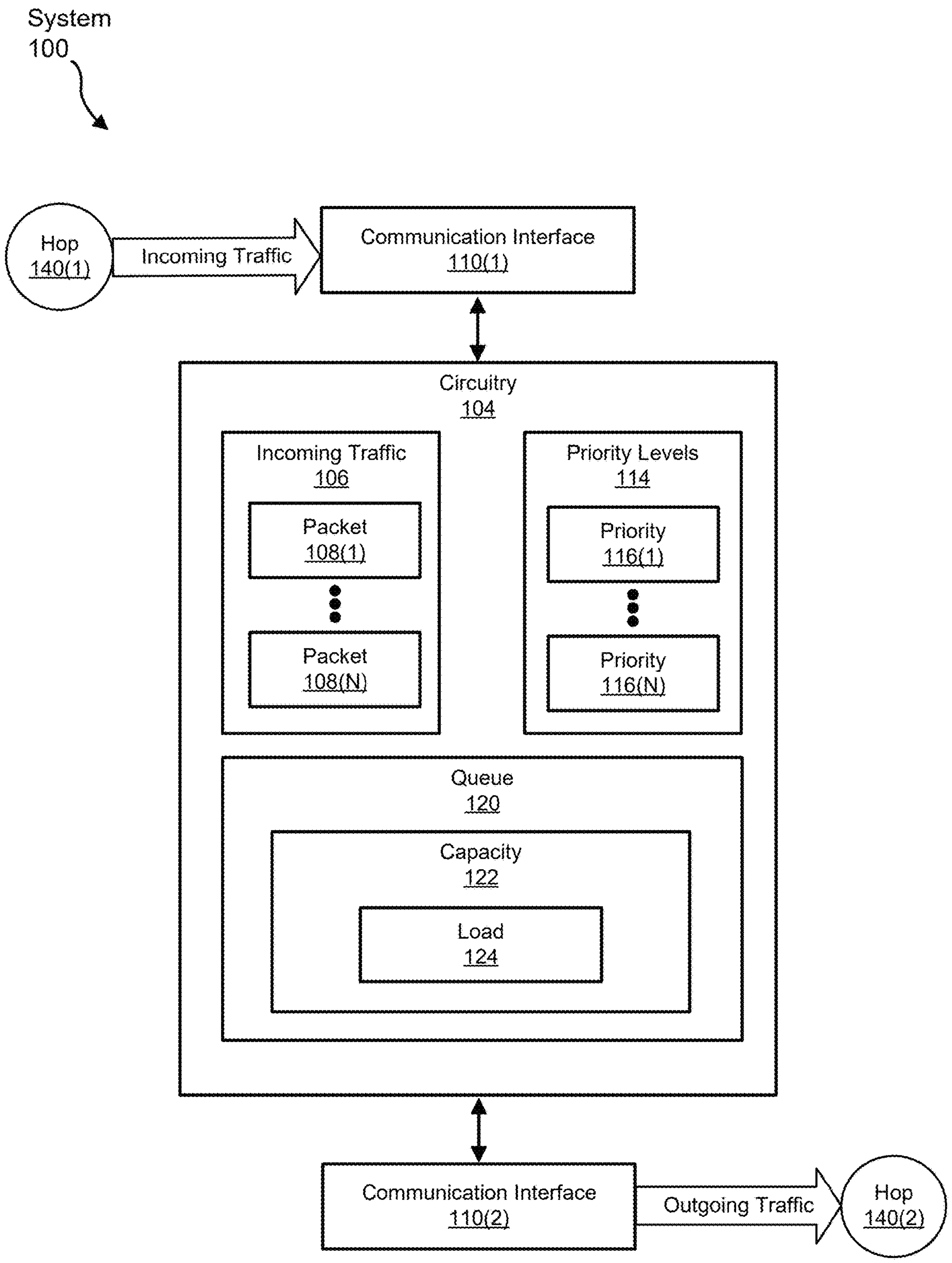
FIG. 1 is a block diagram of an exemplary system for preventing high priority packet drops via adaptive queue limits in accordance with one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for preventing high priority packet drops via adaptive queue limits. In some examples, network devices (e.g., routers, switches, etc.) may include and/or represent queues whose features and/or attributes are controlled by queue limit factors (QLFs). As will be explained in greater detail below, embodiments of the instant disclosure may involve an adaptive QLF mechanism and/or tool that ensures and/or applies preferential treatment and/or protection for high priority traffic, especially in the event of traffic storm conditions.

For example, the adaptive QLF mechanism may adaptively adjust the QLFs of an input queue included in and/or implemented by a network device based at least in part on a real-time traffic analysis and/or packet drop statistics. In this example, in the event of a traffic storm that potentially fills and/or saturates the input queue with low and/or medium priority packets, the adaptive QLF mechanism may set, reconfigure, and/or reprogram the QLFs of the input queue to decrease the number of low and/or medium priority packets permitted in the input queue at a given time. By doing so, the QLF mechanism may essentially reserve and/or maintain a certain amount of space in the queue for high priority packets. As a result, the QLF mechanism may be able to mitigate IGP session flaps and/or errors caused by dropping certain high priority packets (e.g., keep-alive packets, hello packets, etc.), thereby improving network reliability and/or stability in high-demand environments, such as data centers.

The following will provide, with reference to FIGS. 1-5 detailed descriptions of exemplary devices, systems, implementations, and/or corresponding features or components for preventing high priority packet drops via adaptive queue limits. Detailed descriptions of corresponding computer-implemented methods and flow diagrams will be provided in connection with FIGS. 6 and 7. In addition, detailed descriptions of an exemplary computing system for carrying out these methods will be provided in connection with FIG. 8.

FIG. 1 illustrates an exemplary system 100 that facilitates preventing high priority packet drops via adaptive queue limits. As illustrated in FIG. 1, exemplary system 100 may include and/or represent circuitry 104 and communication interfaces 110(1)-(2). In some examples, circuitry 104 may be communicatively coupled to communication interfaces 110(1)-(N). In one example, communication interface 110 (1) may receive incoming traffic 106 that have priority levels 114 from a hop 140(1) included in a network. In this example, incoming traffic 106 may be destined for one or more computing devices, such as a hop 140(2), included in the network. In this example, circuitry 104 may load and/or insert some or all of incoming traffic 106 into a queue 120 for processing and/or forwarding within the network.

In some examples, incoming traffic 106 may include and/or represent packets 108(1)-(N) that each have one of priority levels 114, such as priorities 116(1)-(N). For example, packet 108(1) may have a priority 116(1) included in priority levels 114, and/or packet 108(N) may have a priority 116(N) included in priority levels 114. In this example, priorities 116(1)-(N) may include and/or represent a low priority, a medium priority, and/or a high priority. These priority levels may be considered and/or measured relative to one another. In one example, circuitry 104 may determine that packet 108(1) has been dropped. In certain implementations, packet 108(1) may be dropped due at least in part to queue 120 being overloaded, full, and/or saturated.

In some examples, a dropped packet may constitute and/or represent any packet that is lost at an intermediate node within a network route and/or path. Additionally or alternatively, a dropped packet may constitute and/or represent any packet that fails to reach its ultimate destination.

In some examples, circuitry 104 may detect the rate of incoming traffic 106. For example, circuitry 104 may detect and/or determine that a load 124 of queue 120 constitutes and/or reaches a certain percentage of a capacity 122 of queue 120. In one example, circuitry 104 may continuously monitor load 124 of queue 120 and/or the composition of queue 120. In this example, while doing so, circuitry 104 may detect and/or determine that load 124 reaches, exceeds, and/or satisfies a certain threshold of capacity 122. As a specific example, circuitry 104 may detect and/or determine that load 124 represents fifty percent (50%), sixty percent (60%), seventy percent (70%), eighty percent (80%), ninety percent (90%) or more of the total capacity of queue 120.

In some examples, circuitry 104 may detect the rate of incoming traffic 106 having a low priority level and/or a medium priority level. In one example, while monitoring load 124 and/or its composition, circuitry 104 may detect and/or determine that load 124 includes and/or represents a ratio of low and/or medium priority packets that exceeds a certain threshold. As a specific example, circuitry 104 may detect and/or determine that load 124 includes a number of low and/or medium priority packets that represent and/or amount to fifty percent (50%), sixty percent (60%), seventy percent (70%), eighty percent (80%), ninety percent (90%) or more of the total capacity of queue 120.

In some examples, circuitry 104 may set, configure, and/or program a limit (e.g., a QLF) that causes low priority packets included in incoming traffic 106 to be dropped when load 124 of queue 120 reaches at least seventy percent (70%) of capacity 122 of queue 120. Additionally or alternatively, circuitry 104 may set, configure, and/or program a limit (e.g., a QLF) that causes medium priority packets included in incoming traffic 106 to be dropped when load 124 of queue 120 reaches at least eighty percent (80%) of capacity 122 of queue 120.

In some examples, circuitry 104 may detect and/or determine whether a traffic storm has occurred based at least in part on the rate of the incoming traffic. For example, if queue 120 is loaded with incoming traffic 106 beyond and/or over a certain threshold, circuitry 104 may determine that a traffic storm has occurred. In this example, if queue 120 is loaded with incoming traffic 106 below and/or under that threshold, circuitry 104 may determine that a traffic storm has not occurred. Accordingly, the current queue depth may indicate to circuitry 104 whether a traffic storm has occurred.

In one example, a traffic storm may include and/or represent an abnormally high number of broadcast and/or multicast packets within a short period of time. In other words, a traffic storm may correspond to and/or be characterized by a temporary spike in the number of broadcast and/or multicast packets received by communication interface 110(1) and/or circuitry 104. The term "traffic storm" is sometimes used interchangeably with the terms "broadcast storm," "broadcast radiation," and/or "network storm."

In some examples, circuitry 104 may classify and/or categorize incoming traffic 106 into priority levels 114. In one example, circuitry 104 may classify incoming traffic 106 in this way based at least in part on the type of packet identified in one or more headers of the packet. For example, circuitry 104 may parse and/or search a packet for one or more headers (e.g., an Internet protocol header, a Layer 2 header, a Layer 3 header, a Layer 4 header, etc.) for the corresponding packet type. In this example, circuitry 104 may then classify the packet as low priority, medium priority, and/or high priority based at least in part on the identified packet type. In certain implementations, circuitry 104 may classify incoming traffic 106 in such ways by performing deep packet inspection (DPI) on incoming traffic 106. Accordingly, circuitry 104 may detect and/or determine priority levels 114 of individual packets via DPI.

In one example, a high priority packet may include and/or indicate a keep-alive and/or hello packet type. In another example, a low priority packet may include and/or indicate an error and/or destination unreachable packet type.

In some examples, circuitry 104 may detect and/or determine that low priority packets represent and/or account for a certain portion (e.g., 40%) of load 124 or capacity 122. In other words, circuitry 104 may detect and/or determine that queue 120 is filled and/or loaded to a certain level and/or depth (e.g., 40% of load 124 or capacity 122) with low priority packets. In some examples, circuitry 104 may detect and/or determine that medium priority packets represent and/or account for a certain portion (e.g., 30%) of load 124 or capacity 122. In other words, circuitry 104 may detect and/or determine that queue 120 is filled and/or loaded to a certain level and/or depth (e.g., 30% of load 124 or capacity 122) with medium priority packets. Additionally or alternatively, circuitry 104 may detect and/or determine that high priority packets represent and/or account for a certain portion (e.g., 30%) of load 124 or capacity 122. In other words, circuitry 104 may detect and/or determine that queue 120 is filled and/or loaded to a certain level and/or depth (e.g., 30% of load 124 or capacity 122) with high priority packets.

In some examples, circuitry 104 may detect and/or determine that a high priority packet has been dropped from queue 120. A packet may be dropped for a variety of reasons. For example, if queue 120 is full and/or saturated (e.g., due to a traffic storm), then one or more packets may be dropped, thereby preventing such packets from reaching their respective destinations. In certain implementations, circuitry 104 may detect a packet that is dropped due to a traffic storm.

In some examples, circuitry 104 may detect and/or determine that the rate of low and/or medium priority packets included in incoming traffic 106 in response to the dropped packet. In one example, circuitry 104 may determine and/or discover whether a traffic storm has occurred based at least in part on the rate of low and/or medium priority traffic. For example, circuitry 104 may determine and/or discover whether a traffic storm has occurred based at least in part on the rate of low and/or medium priority traffic.

In some examples, circuitry 104 may adapt, modify, and/or change at least one limit (e.g., QLFs) of queue 120 based at least in part on whether a traffic storm occurred. In other words, circuitry 104 may adapt, modify, and/or change at least one limit (e.g., QLFs) of queue 120 in view of load 124 relative to capacity 122. For example, if a traffic storm has occurred, circuitry 104 may modify the limit to reduce the amount of low and/or medium priority traffic allowed in queue 120 by twenty percent (20%), twenty-five percent (25%), thirty percent (30%), etc. By reducing the amount of low priority traffic and/or medium priority traffic that is allowed and/or permitted in queue 120 in this way, circuitry 104 may effectively reserve more space in queue 120 for high priority traffic. In another example, if a traffic storm has not occurred, circuitry 104 may modify the limit to reduce the amount of low and/or medium priority traffic allowed in queue 120 by five percent (5%), ten percent (10%), fifteen percent (15%), etc.

In one example, prior to the modification, the limit may cause circuitry 104 to ensure that incoming low priority packets are dropped if queue 120 is loaded beyond and/or over a certain level (e.g., 70% of capacity 122). In this example, the modification may reduce the limit to cause circuitry 104 to ensure that incoming low priority packets are dropped if queue 120 is loaded beyond and/or over a different level (e.g., 40% of capacity 122). As another example, prior to the modification, the limit may cause circuitry 104 to ensure that incoming medium priority packets are dropped if queue 120 is loaded beyond and/or over a certain level (e.g., 80% of capacity 122). In this example, the modification may reduce the limit to cause circuitry 104 to ensure that incoming medium priority packets are dropped if queue 120 is loaded beyond and/or over a different level (e.g., 45% of capacity 122).

In some examples, circuitry 104 may decrease load 124 of queue 120 by removing and/or deleting one or more low and/or medium priority packets from queue 120. In one example, circuitry 104 may decrease load 124 of queue 120 by preventing low and/or medium priority packets from being added to queue 120.

In some examples, circuitry 104 may detect and/or determine that an additional high priority packet has been dropped from queue 120. In one example, circuitry 104 may further adapt, modify, and/or change the limit (e.g., QLF) of queue 120 in response to the additional high priority packet having been dropped. In this example, the further modified limit of queue 120 may further reduce the amount of low and/or medium priority packets permitted in queue 120. For example, the modification may further reduce the limit to cause circuitry 104 to ensure that incoming low and/or medium priority packets are dropped if queue 120 is loaded beyond and/or over a different level (e.g., 30% of capacity 122).

In some examples, circuitry 104 may decrease load 124 of queue 120 to comply with the modified limit of queue 120. In one example, circuitry 104 may decrease load 124 of queue 120 to reserve more space in queue 120 for high priority traffic. Additionally or alternatively, circuitry 104 may reduce the drop rate of high priority packets. As a result, circuitry 104 may be able to forward more high priority packets as outgoing traffic to one or more computing devices, such as hop 140(2).

In some examples, circuitry 104 may determine that no high priority packets have been dropped in a certain amount of time (e.g., 3 seconds, 5 seconds, 10 seconds, etc.). In one example, circuitry 104 may revert the limit (e.g., QLF) of queue 120 back to a default value in response to no high priority packets having been dropped in that amount of time. Additionally or alternatively, circuitry 104 may gradually revert the limit (e.g., QLF) of queue 120 back toward the default value in increments over time.

In some examples, circuitry 104 may include and/or represent one or more electrical and/or electronic circuits capable of processing, applying, modifying, transforming, displaying, transmitting, receiving, and/or executing data for system 100. In one example, circuitry 104 may access and/or analyze data stored in storage device to facilitate and/or support preventing high priority packet drops via adaptive queue limits. Additionally or alternatively, circuitry 104 may launch, perform, and/or execute certain executable files, code snippets, and/or computer-readable instructions to facilitate and/or support preventing high priority packet drops via adaptive queue limits.

Although illustrated as a single unit in FIG. 1, circuitry 104 may include and/or represent a collection of multiple processing units and/or electrical or electronic components that work and/or operate in conjunction with one another. In one example, circuitry 104 may include and/or represent one or more application-specific integrated circuits (ASICs). Additionally or alternatively, circuitry 104 may include and/or represent one or more central processing units (CPUs) and/or graphics processing units (GPUs). Examples of circuitry 104 include, without limitation, processing devices, microprocessors, microcontrollers, field-programmable gate arrays (FPGAs), systems on chips (SoCs), parallel accelerated processors, tensor cores, integrated circuits, chiplets, optical modules, receivers, transmitters, transceivers, storage devices, memory devices, logical circuitry, portions of one or more of the same, variations or combinations of one or more of the same, and/or any other suitable circuitry.

In some examples, communication interfaces 110(1)-(2) may each include and/or represent one or more ports, connections, physical interfaces, Ethernet interfaces, and/or transceivers that establish and/or support communications between computing devices. Additionally or alternatively, communication interfaces 110(1)-(2) may each include and/or represent one or more virtual and/or logic interfaces that establish and/or support communications between computing devices. For example, communication interfaces 110(1)-(2) may include and/or represent one or more aggregated Ethernet (AE) interfaces and/or link aggregation groups (LAGs).

In some examples, system 100 may include and/or represent any type or form of physical computing device capable of reading computer-executable instructions and/or handling network traffic. Examples of system 100 include, without limitation, network devices, routers (such as provider edge routers, hub routers, spoke routers, autonomous system boundary routers, and/or area border routers), rack-mount telecommunications devices, switches, hubs, modems, bridges, repeaters, gateways (such as broadband network gateways), multiplexers, network adapters, network interfaces, client devices, laptops, tablets, desktops, servers, variations or combinations of one or more of the same, and/or any other suitable systems.

Figure 2:
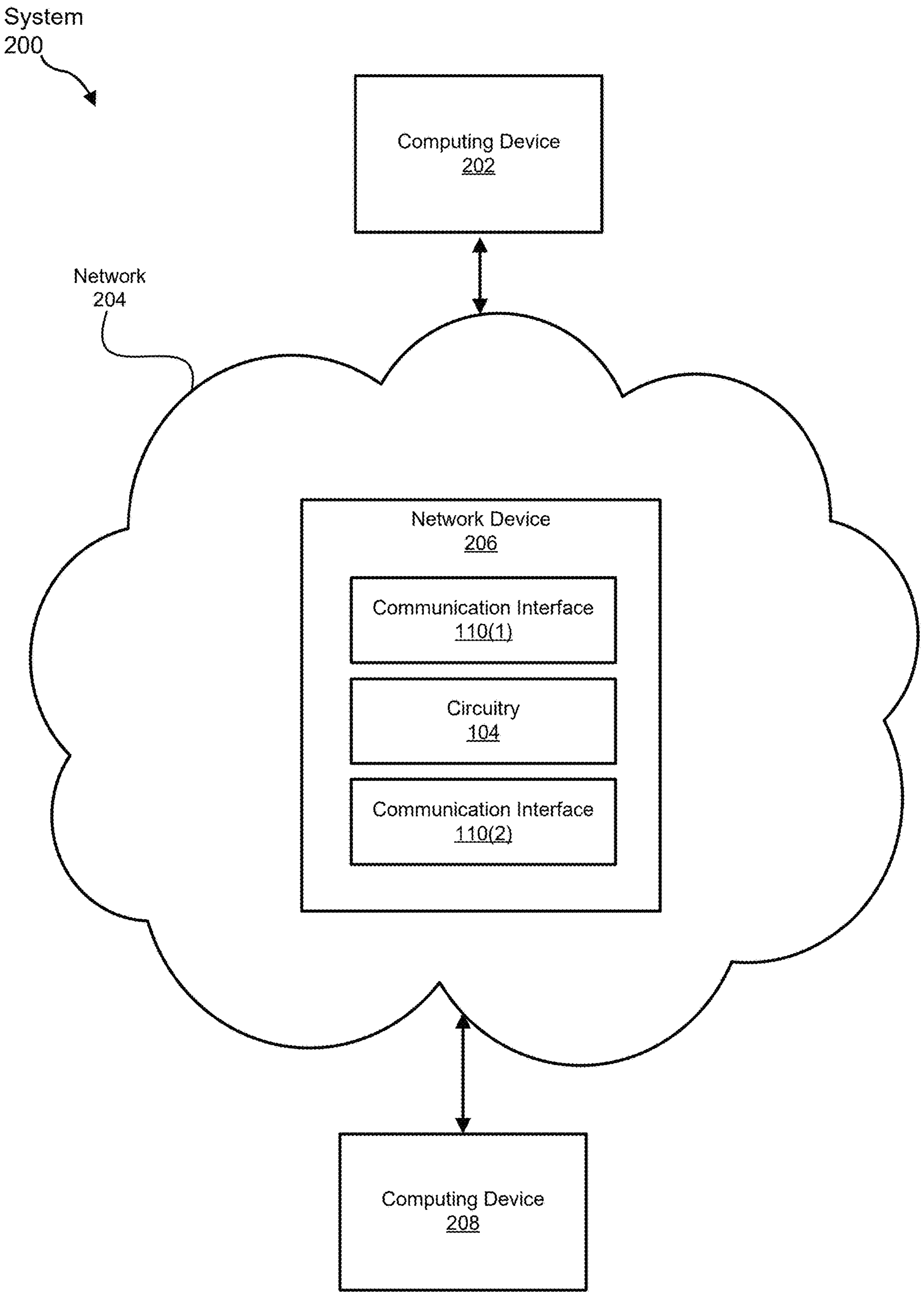
FIG. 2 is a block diagram of an exemplary system for preventing high priority packet drops via adaptive queue limits in accordance with one or more embodiments of this disclosure.

FIG. 2 illustrates an exemplary system 200 for preventing high priority packet drops via adaptive queue limits. In some examples, system 200 may include and/or represent certain devices, components, and/or features that perform and/or provide functionalities that are similar and/or identical to those described above in connection with FIG. 1. In one example, system 200 may include and/or represent a network device 206, a computing device 202, and/or a computing device 208 communicatively coupled to one another via a network 204. In this example, network device 206 may include and/or represent circuitry 104 and communication interfaces 110(1)-(2). Although computing devices 202 and 208 are illustrated as being external to network 204 in FIG. 2, alternative embodiments may involve computing devices 202 and 208 as being internal to network 204.

In some examples, communication interface 110(1) may receive incoming traffic 106 of priority levels 114 from computing device 202 via network 204. In one example, incoming traffic 106 may be destined for computing device 208. In this example, circuitry 104 may load and/or insert some or all of incoming traffic 106 into queue 120 for processing and/or forwarding toward computing device 208 via network 204.

In some examples, circuitry 104 may detect a packet dropped from queue 120. In one example, circuitry 104 may determine that the dropped packet has a high priority level. In response to determining that the dropped packet has a high priority level, circuitry 104 may detect and/or determine the rate of incoming traffic 106. For example, circuitry 104 may detect and/or determine that load 124 of queue 120 has reached and/or surpassed a threshold percentage of capacity 122. In this example, circuitry 104 may determine and/or discover whether a traffic storm has occurred based at least in part on load 124 relative to the threshold percentage of capacity 122.

In one example, if a traffic storm has occurred, circuitry 104 may modify a limit (e.g., QLF) of queue 120 to reduce the amount of low and/or medium priority traffic allowed in queue 120 by twenty percent (20%), twenty-five percent (25%), thirty percent (30%), etc. In another example, if a traffic storm has not occurred, circuitry 104 may modify the limit to reduce the amount of low and/or medium priority traffic allowed in queue 120 by five percent (5%), ten percent (10%), fifteen percent (15%), etc. By doing so, circuitry 104 may reduce load 124 to prevent load 124 from reaching and/or exceeding the threshold percentage of capacity 122.

In some examples, incoming traffic 106 may be destined for network device 206 and/or computing device or component included in network device 206. Accordingly, incoming traffic 106 may be destined for a computing device included in the same network device as communication interface 110(1). For example, circuitry 104 may implement and/or execute a control plane and/or a forwarding plane. In one example, incoming traffic 106 may be destined for an application running in the control plane of network device 206. Examples of such an application, without limitation, IGP applications, Ethernet operations, administration, and maintenance (OAM) applications, telemetry applications, simple network management protocol (SNMP) applications, open shortest path first (OSFP) applications, combinations or variations of one or more of the same, and/or any other suitable application. Network 204 generally represents any medium or architecture capable of facilitating communication or data transfer. In one example, network 204 may facilitate communication between network device 206 and computing device 202 and/or computing device 208. In particular, network 204 may facilitate and/or support this communication via one or more intermediate nodes (e.g., hops) between network device 206 and computing device 202 and/or computing device 208. These intermediate nodes may represent and/or include any type or form of suitable network device.

Network 204 may facilitate and/or support communication or data transfer using wireless and/or wired connections. In one example, network 204 may include and/or represent all or a portion of the Internet. Additional examples of network 204 include, without limitation, an intranet, a Wide Area Network (WAN), a Local Area Network (LAN), a Personal Area Network (PAN), Power Line Communications (PLC), a cellular network (e.g., a Global System for Mobile Communications (GSM) network), an multiprotocol label switching (MPLS) network, portions of one or more of the same, variations or combinations of one or more of the same, and/or any other suitable network.

Figure 3:
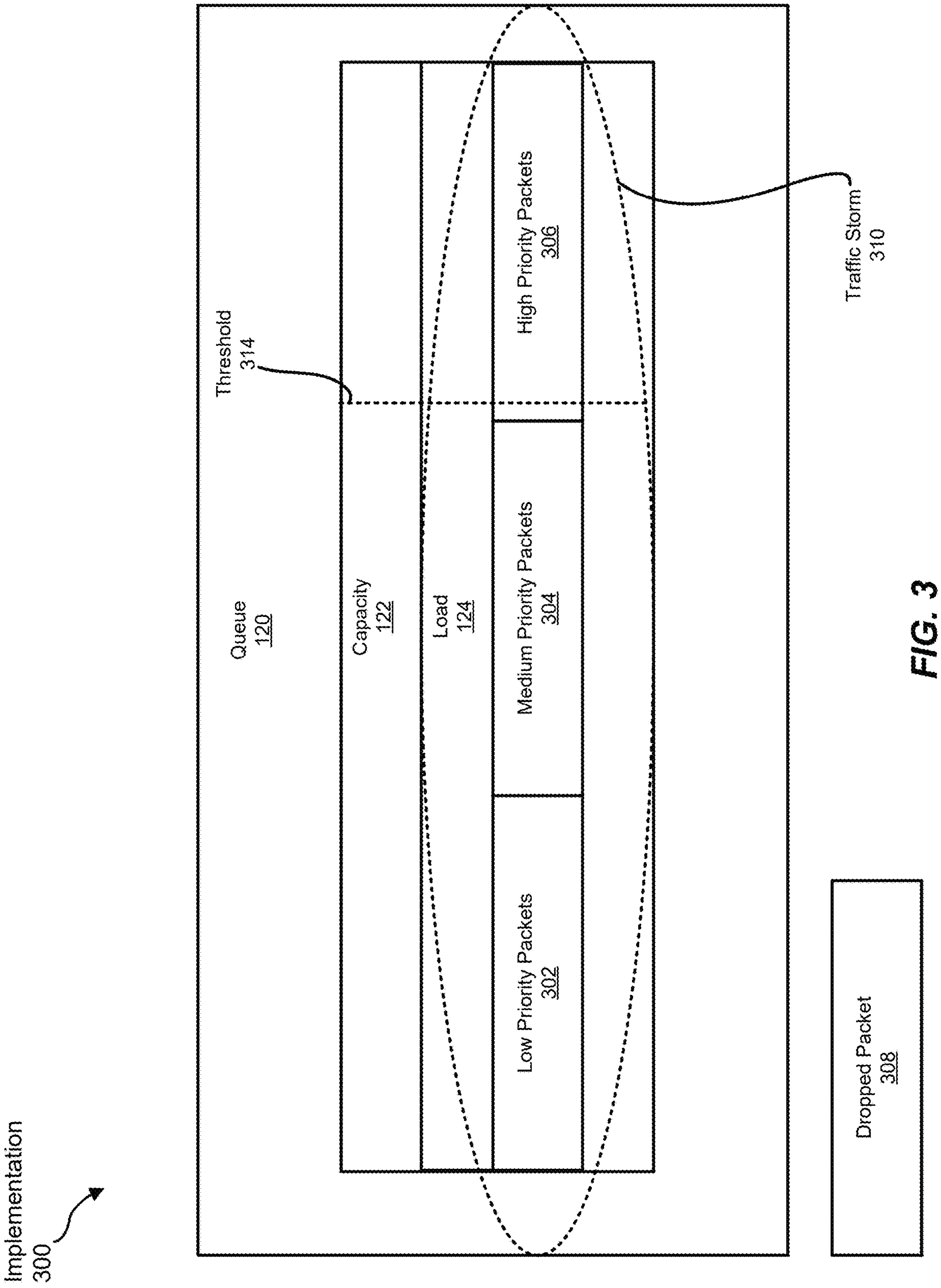
FIG. 3 is a block diagram of an exemplary implementation for preventing high priority packet drops via adaptive queue limits in accordance with one or more embodiments of this disclosure.

FIG. 3 illustrates an exemplary implementation 300 of a traffic storm 310 that causes queue 120 to reach saturation. In some examples, implementation 300 may include and/or represent certain devices, components, and/or features that perform and/or provide functionalities that are similar and/or identical to those described above in connection with either FIG. 1 or FIG. 2. In one example, implementation 300 may include, represent, and/or involve load 124 of queue 120 as reaching capacity 122 of queue 120. In this example, queue 120 may be full and/or saturated by load 124. In certain embodiments, load 124 may include and/or represent low priority packets 302, medium priority packets 304, and/or high priority packets 306.

In some examples, the saturation of queue 120 may lead to and/or cause a dropped packet 308. In one example, circuitry 104 may detect dropped packet 308 and then determine that dropped packet 308 has a high priority level. In response to determining that the dropped packet has a high priority level, circuitry 104 may detect and/or determine the rate of incoming traffic 106. For example, circuitry 104 may detect and/or determine that load 124 of queue 120 has reached and/or surpassed a threshold 314 of capacity 122. In this example, circuitry 104 may determine and/or discover that a traffic storm 310 has occurred based at least in part on load 124 reaching and/or surpassing threshold 314 of capacity 122. In certain implementations, in response to traffic storm 310 having occurred, circuitry 104 may modify one or more limits (e.g., QLFs) of queue 120 to reduce the amount of low priority packets 302 and/or medium priority packets 304 allowed in queue 120 by twenty percent (20%), twenty-five percent (25%), thirty percent (30%), etc.

Figure 4:
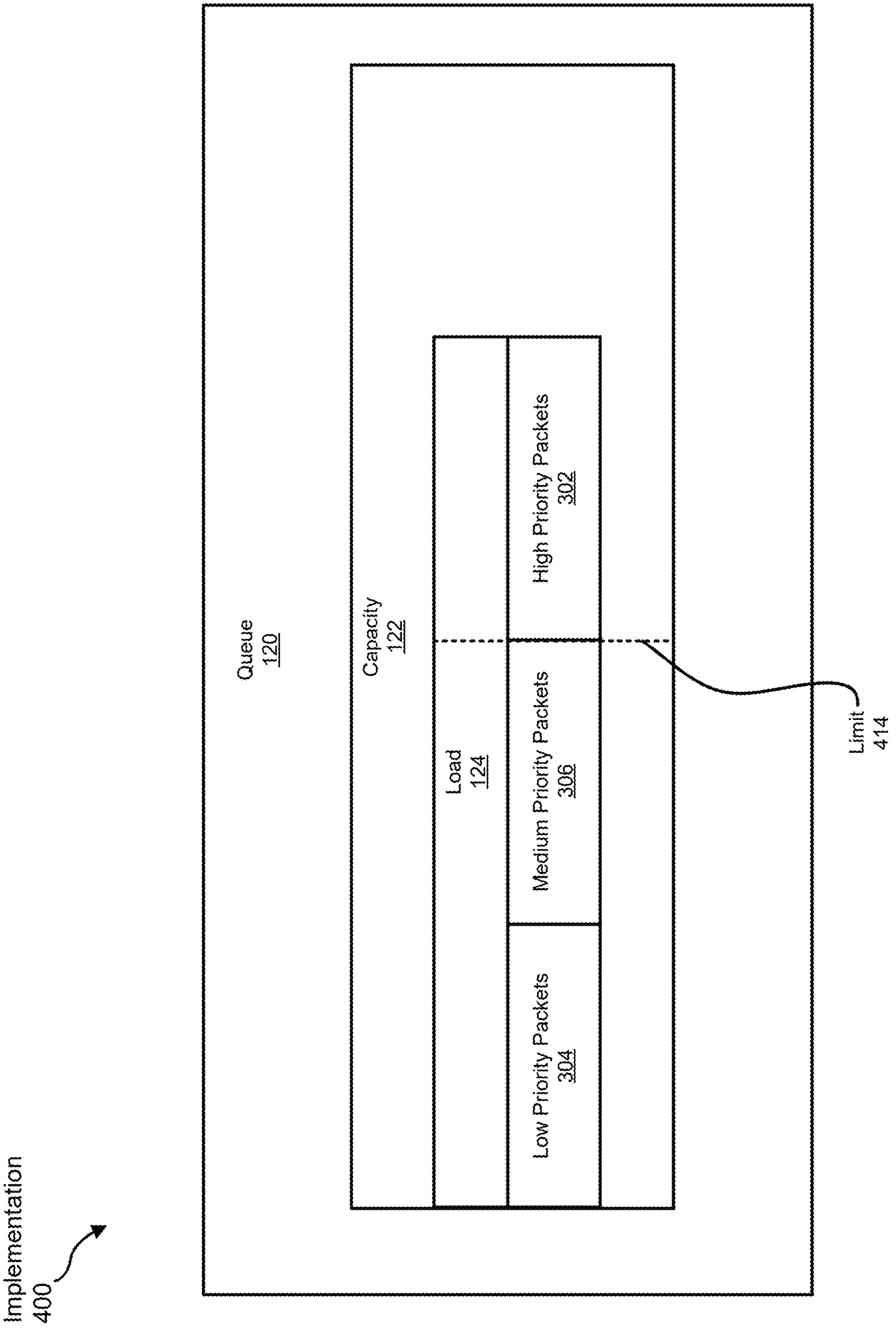
FIG. 4 is a block diagram of an exemplary implementation for preventing high priority packet drops via adaptive queue limits in accordance with one or more embodiments of this disclosure.

FIG. 4 illustrates an exemplary implementation 400 of a modification to a limit 414 of queue 120. In some examples, implementation 400 may include and/or represent certain devices, components, and/or features that perform and/or provide functionalities that are similar and/or identical to those described above in connection with any of FIGS. 1-3. In one example, implementation 400 may include, represent, and/or involve a reduction of load 124 in response to limit 414 having been set and/or modified to prevent high priority packet drops.

In some examples, circuitry 104 may set and/or modify limit 414 of queue 120 to reduce the amount of low priority packets 302 and/or medium priority packets 304 allowed in queue 120 in response to detecting traffic storm 310. By doing so, circuitry 104 may ensure that some low priority packets 304 and/or medium priority packets 308 are dropped if they collectively reach and/or exceed limit 414. As a result, circuitry 104 may effectively prevent high priority packets 302 from being dropped despite traffic storm 310.

Figure 5:
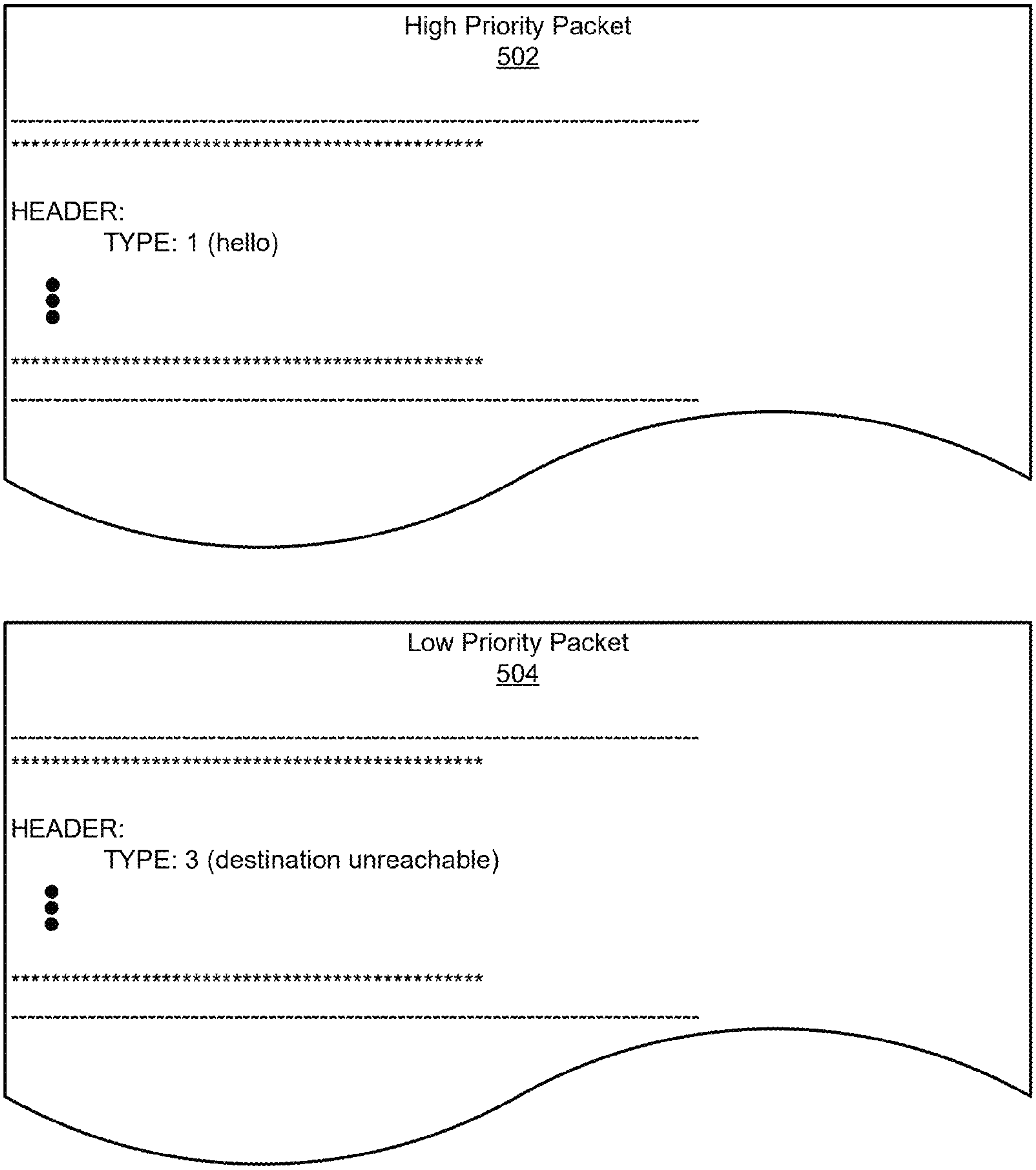
FIG. 5 is an illustration of an exemplary high priority packet and/or an exemplary low priority packet in accordance with one or more embodiments of this disclosure.

FIG. 5 illustrates an exemplary high priority packet 502 and/or an exemplary low priority packet 504. In some examples, high priority packet 502 and/or low priority packet 504 may include and/or represent certain components and/or features that perform and/or provide utilities or functionalities that are similar and/or identical to those described above in connection with any of FIGS. 1-4. In one example, circuitry 104 may perform DPI on high priority packet 502 and/or low priority packet 504 to classify their respective priority levels.

In some examples, circuitry 104 may classify high priority packet 502 and/or low priority packet 504 based at least in part on the type of packet identified in their respective headers. For example, circuitry 104 may parse and/or search high priority packet 502 for a header indicating the packet type. In this example, upon parsing and/or searching high priority packet 502, circuitry 104 may find a header indicating that high priority packet 502 is a type 1 hello packet. Circuitry 104 may then determine the priority level of high priority packet 502 based at least in part on the type 1 hello indicator found in the header.

As another example, circuitry 104 may parse and/or search low priority packet 504 for a header indicating the packet type. In this example, upon parsing and/or searching low priority packet 504, circuitry 104 may find a header indicating that low priority packet 504 is a type 3 destination-unreachable packet. Circuitry 104 may then determine the priority level of low priority packet 504 based at least in part on the type 3 destination-unreachable indicator found in the header.

In some examples, the systems described in connection with FIGS. 1 and 2 may include and/or represent one or more additional devices, circuits, components, and/or features that are not necessarily illustrated and/or labeled in FIGS. 1 and 2. For example, the systems illustrated in FIGS. 1 and 2 may also include and/or represent additional network devices, computing devices, controllers, routers, switches, analog and/or digital circuitry, onboard logic, transistors, transmitters, receivers, transceivers, antennas, resistors, capacitors, diodes, inductors, switches, registers, flipflops, connections, traces, buses, semiconductor (e.g., silicon) devices and/or structures, processing devices, storage devices, circuit boards, sensors, packages, substrates, housings, combinations or variations of one or more of the same, and/or any other suitable components that facilitate and/or support self-contained reliability testing. In certain implementations, one or more of these additional devices, circuits, components, and/or features may be inserted and/or applied between any of the existing devices, circuits, components, and/or features illustrated in FIGS. 1 and 2 consistent with the aims and/or objectives described herein. Accordingly, the couplings and/or connections described with reference to FIGS. 1 and 2 may be direct connections with no intermediate components, devices, and/or nodes or indirect connections with one or more intermediate components, devices, and/or nodes.

In some examples, the phrase "to couple" and/or the term "coupling," as used herein, may refer to a direct connection and/or an indirect connection. For example, a direct coupling between two components may constitute and/or represent a coupling in which those two devices or components are directly connected to each other by a single node that provides continuity from one of those two devices or components to the other. In other words, the direct coupling may exclude and/or omit any additional devices or components between those two devices or components.

Additionally or alternatively, an indirect coupling between two devices and/or components may constitute and/or represent a coupling in which those two devices or components are indirectly connected to each other by multiple nodes that fail to provide direct electrical and/or communicative continuity from one of those two devices or components to the other. In other words, the indirect coupling may include and/or incorporate at least one additional device or component between those two devices or components.

Figure 6:
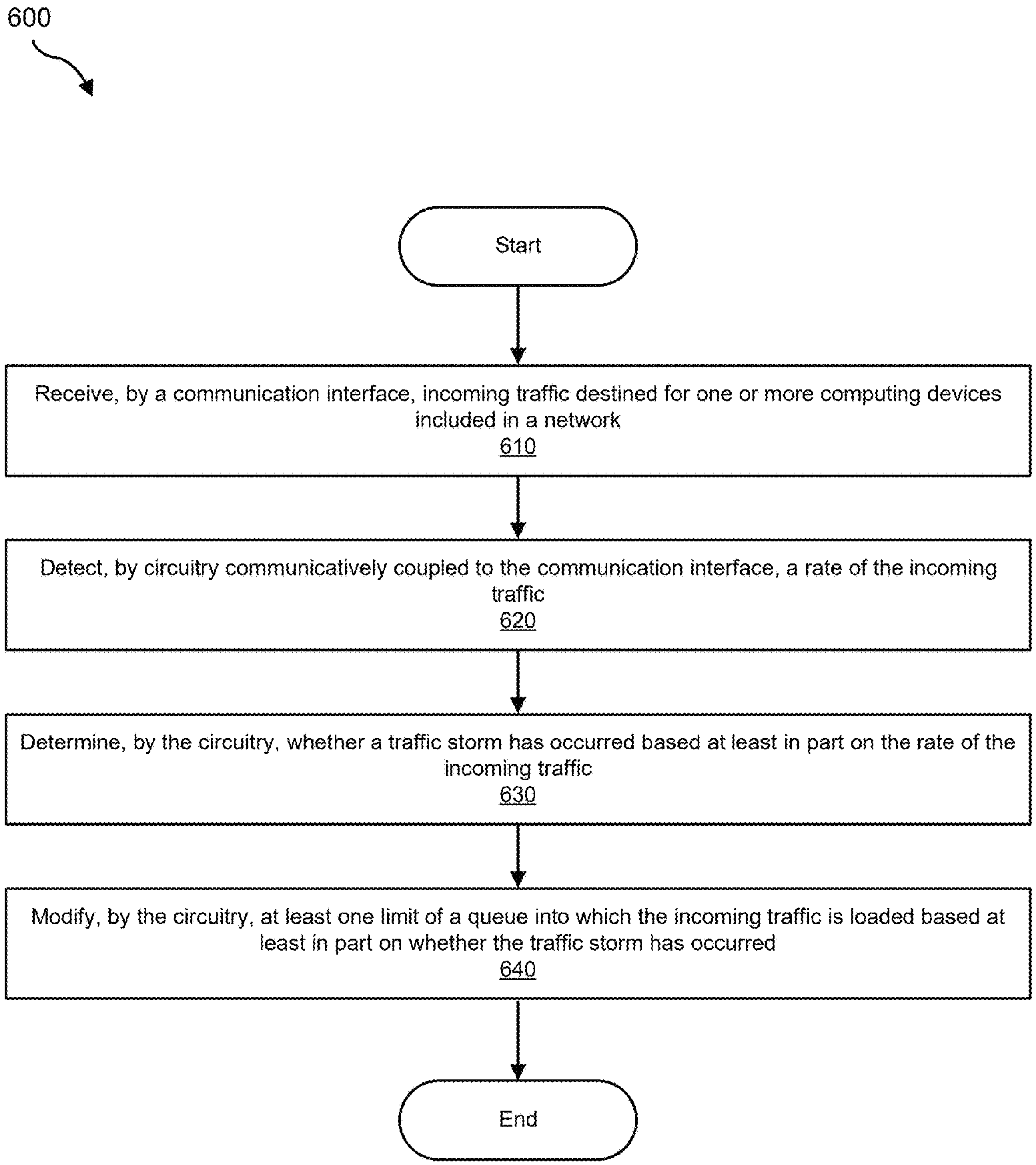
FIG. 6 is a flow diagram of an exemplary method for preventing high priority packet drops via adaptive queue limits in accordance with one or more embodiments of this disclosure.

FIG. 6 is a flow diagram of an exemplary method 600 for preventing high priority packet drops via adaptive queue limits. In one example, the steps shown in FIG. 6 may be achieved and/or accomplished by a network device included in a network. Additionally or alternatively, the steps shown in FIG. 6 may incorporate and/or involve certain sub-steps and/or variations consistent with the descriptions provided above in connection with FIGS. 1-5.

As illustrated in FIG. 6, method 600 may include the step of receiving, by a communication interface, incoming traffic destined for one or more computing devices included in a network (610). Step 610 may be performed in a variety of ways, including any of those described above in connection with FIGS. 1-5. For example, a communication interface included in a network device may receive incoming traffic destined for one or more computing devices included in a network.

Method 600 may also include the step of detecting, by circuitry communicatively coupled to the communication interface, a rate of the incoming traffic (620). Step 620 may be performed in a variety of ways, including any of those described above in connection with FIGS. 1-5. For example, circuitry communicatively coupled to the communication interface may detect a rate of the incoming traffic based at least in part on the current load of a queue included in and/or implemented by the network device.

Method 600 may further include the step of determining, by the circuitry, whether a traffic storm has occurred based at least in part on the rate of the incoming traffic (630). Step 630 may be performed in a variety of ways, including any of those described above in connection with FIGS. 1-5. For example, the circuitry may determine whether a traffic storm has occurred based at least in part on the rate of the incoming traffic.

Method 600 may additionally include the step of modifying, by the circuitry, at least one limit of the queue into which the incoming traffic is loaded based at least in part on whether the traffic storm has occurred (640). Step 640 may be performed in a variety of ways, including any of those described above in connection with FIGS. 1-5. For example, the circuitry may set, modify, and/or adapt at least one limit (e.g., QLF) of the queue into which the incoming traffic is loaded based at least in part on whether a traffic storm has occurred. In one example, the circuitry may modify the limit to restrict more low and/or medium priority packets if a traffic storm has occurred or restrict less low and/or medium priority packets if a traffic storm has not occurred.

Figure 7:
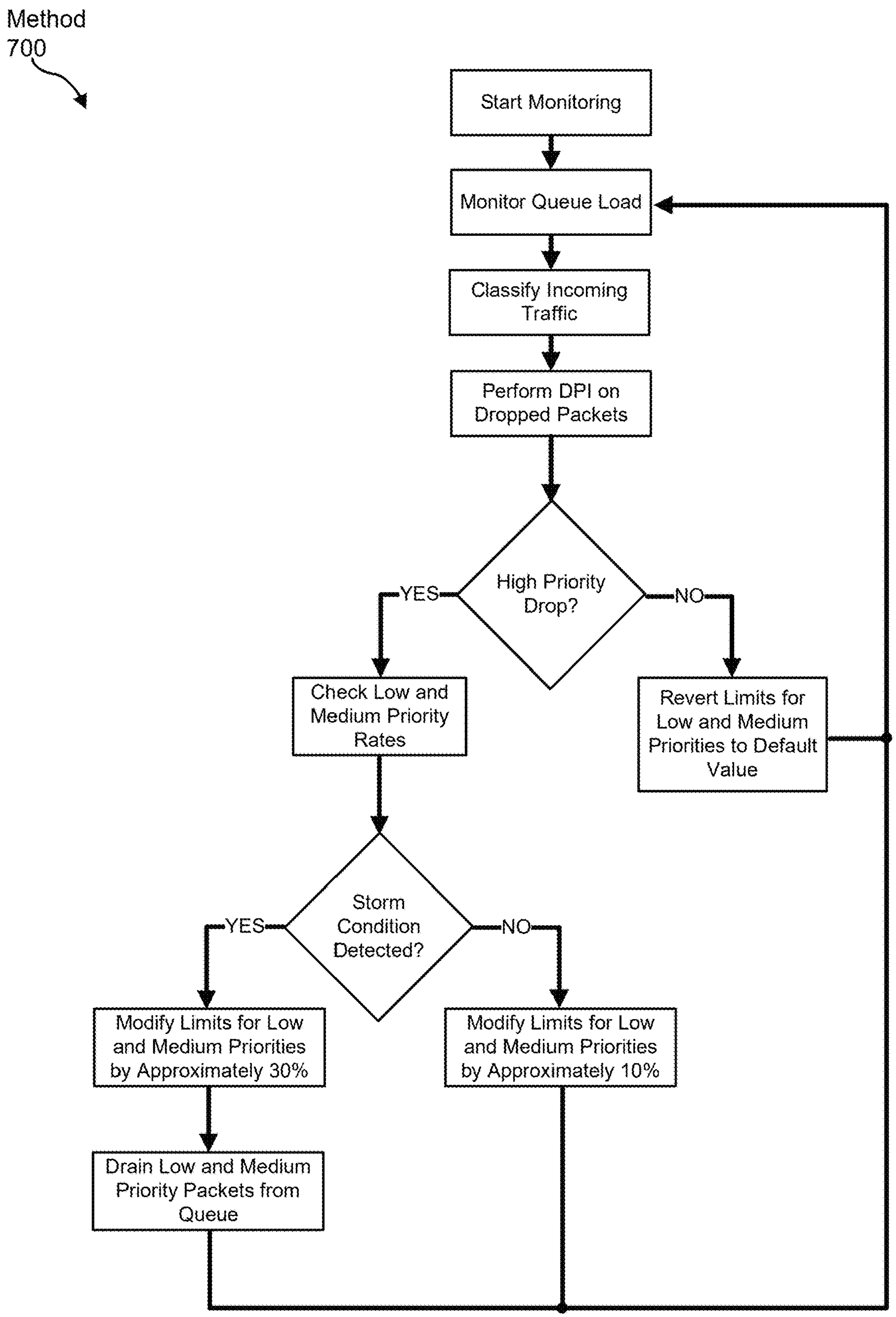
FIG. 7 is a flow diagram of an exemplary method for preventing high priority packet drops via adaptive queue limits in accordance with one or more embodiments of this disclosure.

FIG. 7 is a flow diagram of an exemplary method 700 for preventing high priority packet drops via adaptive queue limits. In one example, the steps shown in FIG. 7 may be achieved and/or accomplished by a network device included in a network. Additionally or alternatively, the steps shown in FIG. 7 may incorporate and/or involve certain sub-steps and/or variations consistent with the descriptions provided above in connection with FIGS. 1-6.

As illustrated in FIG. 7, method 700 may involve starting to monitor incoming traffic and/or monitoring the load of a queue. In some examples, method 700 may also involve classifying incoming traffic based at least in part on the priority levels of individual packets. In one example, method 700 may further involve performing DPI on any dropped packets. In this example, method 700 may additionally involve determining whether any dropped packets have high priority levels.

In some examples, if a dropped packet has a high priority level, method 700 may involve checking the low and/or medium priority rates of the incoming traffic (e.g., based at least in part on the queue load) and then determining whether a traffic storm condition has been detected based at least in part on the low and/or medium priority rates of the incoming traffic. In one example, if none of dropped packets have a high priority level, method 700 may involve reverting and/or returning one or more limits (e.g., QLFs) of the queue to the corresponding default value (whether immediately or gradually) and then continuing to monitor the queue load for traffic spikes and/or dropped packets.

In some examples, if a traffic storm condition has been detected, method 700 may involve modifying one or more limits (e.g., QLFs) of the queue to reduce low and/or medium priority packets by approximately 30% and/or draining some of the low and/or medium priority packets from the queue. In one example, if a traffic storm condition has not been detected, method 700 may involve modifying one or more limits (e.g., QLFs) of the queue to reduce low and/or medium priority packets by approximately 10%. Either way, upon making such a modification to the queue limits, circuitry 104 may continue to monitor the queue load for traffic spikes and/or dropped packets.

Figure 8:
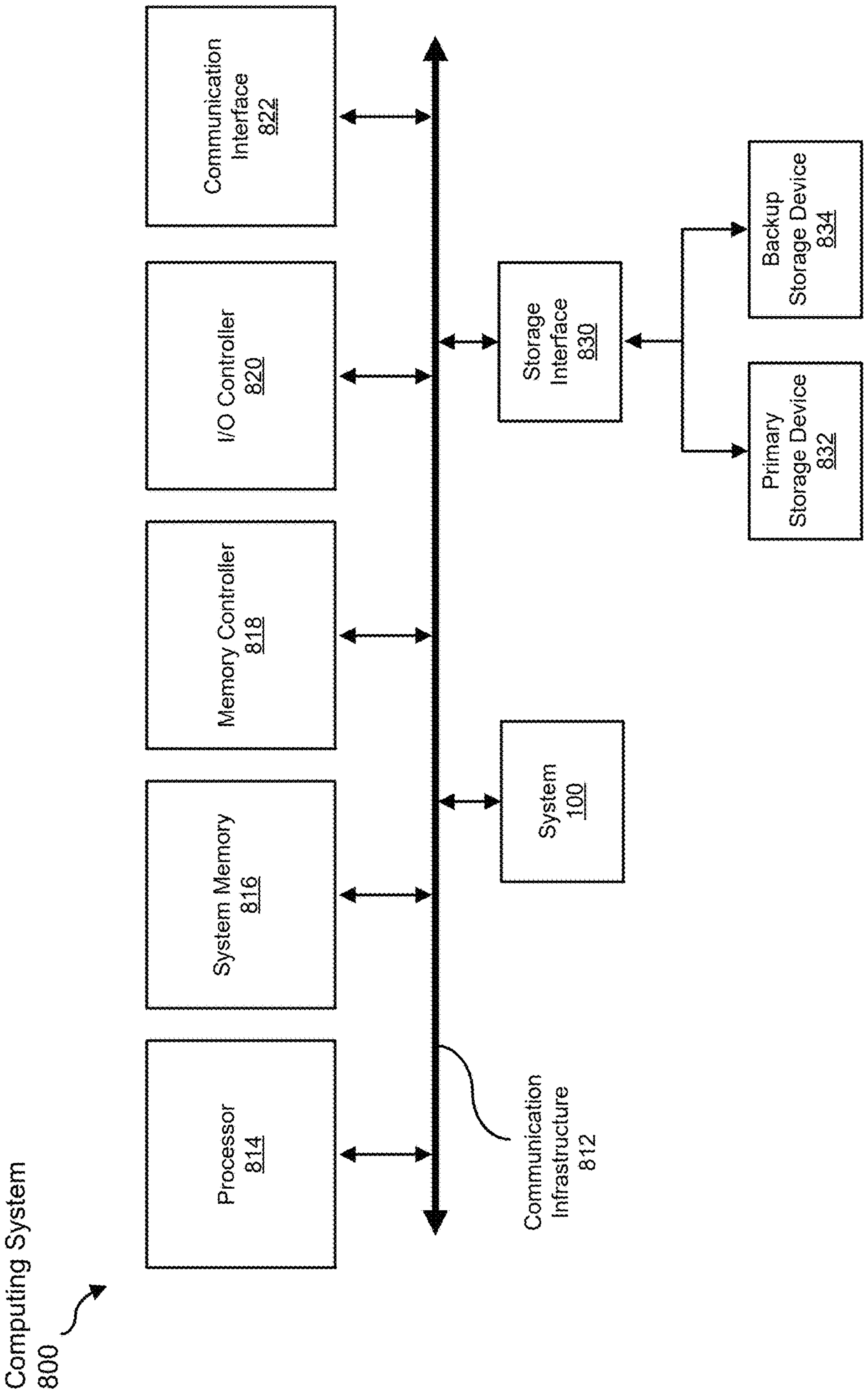
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 6 or FIG. 7. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below).

System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
- at least one communication interface configured to receive incoming traffic destined for one or more computing devices included in a network; and
- circuitry configured to:
  - classify the incoming traffic into priority levels that comprise a higher priority level and a lower priority level relative to one another;
  - determine that a dropped packet has the higher priority level;
  - detect a rate of the incoming traffic that has the lower priority level in response to the dropped packet having the higher priority level;
  - determine whether a traffic storm has occurred based at least in part on the rate of the incoming traffic having the lower priority level; and
  - modify, based at least in part on whether the traffic storm has occurred, at least one limit of a queue into which the incoming traffic is loaded.

2. The system of claim 1, wherein the circuitry is further configured to:
- monitor a load of the queue based at least in part on the incoming traffic loaded into the queue; and
- prior to modifying the limit of the queue, set the limit to drop packets of the incoming traffic that have the lower priority level when the load of the queue reaches at least seventy percent of a capacity of the queue.

3. The system of claim 1, wherein:
- the priority levels further comprise a medium priority level; and
- the circuitry is further configured to:
  - detect the rate of the incoming traffic that has the medium priority level in response to the dropped packet having the higher priority level; and
  - determine whether the traffic storm has occurred based at least in part on the rate of the incoming traffic having the lower priority level or the medium priority level.

4. The system of claim 3, wherein the circuitry is further configured to:
- monitor a load of the queue based at least in part on the incoming traffic loaded into the queue;
- prior to modifying the limit of the queue, set the limit to drop packets of the incoming traffic that have the medium priority level when the load of the queue reaches at least eighty percent of a capacity of the queue.

5. The system of claim 3, wherein the circuitry is further configured to classify the incoming traffic into the priority levels by performing deep packet inspection (DPI) on the incoming traffic.

6. The system of claim 5, wherein the circuitry is further configured to:
- determine that the traffic storm occurred based at least in part on the rate of the incoming traffic that has the lower priority level or the medium priority level; and
- in response to the traffic storm having occurred, modify the limit to reduce an amount of the incoming traffic that has the lower priority level or the medium priority level in the queue.

7. The system of claim 6, wherein the circuitry is further configured to reduce the amount of the incoming traffic that has the lower priority level or the medium priority level in the queue by at least twenty-five percent.

8. The system of claim 6, wherein the circuitry is further configured to:
- determine, after having modified the limit of the queue, that an additional packet included in the incoming traffic has been dropped; and
- in response to the additional packet having been dropped, modify the limit to further reduce the amount of the incoming traffic that has the lower priority level or the medium priority level in the queue.

9. The system of claim 5, wherein the circuitry is further configured to:

determine that the traffic storm did not occur based at least in part on the rate of the incoming traffic that has the lower priority or the medium priority level; and in response to the traffic storm not having occurred, modify the limit to reduce an amount of the incoming traffic that has the lower priority level or the medium priority level in the queue by no more than fifteen percent.

10. The system of claim 1, wherein the circuitry is further configured to:

determine that no packet of the higher priority level has dropped in a certain amount of time; and in response to no packet of the higher priority level having dropped in the certain amount to time, reverting the limit of the queue back toward a default value in gradual increments.

11. The system of claim 1, wherein the circuitry is further configured to decrease a load of the queue by removing, from the queue, one or more packets of the incoming traffic that have a certain priority level.

12. The system of claim 11, wherein the circuitry is further configured to:

decrease the load of the queue to comply with the limit of the queue; or decrease the load of the queue to reserve a certain amount of space in the queue for packets of the incoming traffic that have a higher priority level than the certain priority level.

13. The system of claim 12, wherein the circuitry is further configured to reduce a drop rate of the packets that have the higher priority level.

14. The system of claim 13, wherein the packets that have the higher priority level comprise keep-alive packets.

15. The system of claim 12, wherein the circuitry is further configured to forward the packets that have the higher priority level toward the one or more computing devices.

16. A computer-implemented method comprising:

receiving, by at least one communication interface, incoming traffic destined for one or more computing devices included in a network;

classifying the incoming traffic into priority levels that comprise a higher priority level and a lower priority level relative to one another;

determining that a dropped packet has the higher priority level;

detecting, by circuitry communicatively coupled to the communication interface, a rate of the incoming traffic that has the lower priority level in response to the packet having been dropped and the packet having the higher priority level;

determining, by the circuitry, whether a traffic storm has occurred based at least in part on the rate of the incoming traffic having the lower priority level; and modifying, by the circuitry, at least one limit of a queue into which the incoming traffic is loaded based at least in part on whether the traffic storm has occurred.

17. The computer-implemented method of claim 16, further comprising:

monitoring a load of the queue based at least in part on the incoming traffic loaded into the queue; and prior to modifying the limit of the queue, setting the limit to drop packets of the incoming traffic that have the lower priority level when the load of the queue reaches at least seventy percent of a capacity of the queue.

18. The computer-implemented method of claim 16, further comprising:

determining, by the circuitry, that no packet of the higher priority level has dropped in a certain amount of time; and in response to no packet of the higher priority level having dropped in the certain amount to time, reverting, by the circuitry, the limit of the queue back toward a default value in gradual increments.

19. A network device comprising:

at least one communication interface configured to receive incoming traffic destined for one or more computing devices included in a network; and circuitry configured to:

classify the incoming traffic into priority levels that comprise a higher priority level and a lower priority level relative to one another;

determine that a dropped packet has the higher priority level;

detect a rate of the incoming traffic that has the lower priority level in response to the dropped packet having the higher priority level;

determine whether a traffic storm has occurred based at least in part on the rate of the incoming traffic having the lower priority level; and modify at least one limit of a queue into which the incoming traffic is loaded based at least in part on whether the traffic storm has occurred.

20. The network device of claim 19, wherein the circuitry is further configured to:

determine that no packet of the higher priority level has dropped in a certain amount of time; and in response to no packet of the higher priority level having dropped in the certain amount to time, reverting the limit of the queue back toward a default value in gradual increments.

* * * * *